US008192034B2

(12) United States Patent
Cossart

(10) Patent No.: US 8,192,034 B2
(45) Date of Patent: Jun. 5, 2012

(54) IMAGE VIEWING SYSTEM FOR PASSENGERS OF AN AIRCRAFT AND AIRCRAFT COMPRISING SUCH A SYSTEM

(75) Inventor: Christophe Cossart, Bruguieres (FR)

(73) Assignee: Airbus Operations SAS, Toulouse (FR)

( * ) Notice: Subject to any disclaimer, the term of this patent is extended or adjusted under 35 U.S.C. 154(b) by 623 days.

(21) Appl. No.: 12/280,740

(22) PCT Filed: Feb. 23, 2007

(86) PCT No.: PCT/FR2007/000328

§ 371 (c)(1),
(2), (4) Date: Feb. 5, 2009

(87) PCT Pub. No.: WO2007/096531

PCT Pub. Date: Aug. 30, 2007

(65) Prior Publication Data

US 2009/0310085 A1 Dec. 17, 2009

(30) Foreign Application Priority Data

Feb. 27, 2006 (FR) .................................... 06 01710

(51) Int. Cl.
*G03B 21/14* (2006.01)

(52) U.S. Cl. ............. 353/119; 353/30; 353/31; 353/39; 353/46; 353/69; 353/70; 353/71; 353/72; 353/79; 353/122; 340/945

(58) Field of Classification Search .................... 353/30, 353/31, 39, 46, 69, 70, 71, 72, 79, 119, 122; 340/705, 974, 975, 976, 977, 979, 980, 717, 340/729, 734, 720, 945; 250/229, 224, 221, 250/227.22, 227.23, 216; 349/5, 7, 8, 9; 348/117, 144; 345/156
See application file for complete search history.

(56) References Cited

U.S. PATENT DOCUMENTS

| | | | | | |
|---|---|---|---|---|---|
| 4,740,779 | A * | 4/1988 | Cleary et al. | 345/7 |
| 5,123,728 | A | 6/1992 | Gradin et al. | |
| 5,618,232 | A | 4/1997 | Martin | |
| 5,658,063 | A * | 8/1997 | Nasserbakht | 353/122 |
| 5,811,791 | A * | 9/1998 | Portman | 250/221 |
| 5,864,431 | A * | 1/1999 | Bordovsky | 359/630 |
| 6,639,522 | B2 * | 10/2003 | Derderian | 340/945 |
| 6,964,481 | B2 * | 11/2005 | Pho et al. | 353/12 |
| 7,722,192 | B2 * | 5/2010 | Huonker | 353/82 |
| 7,777,718 | B2 * | 8/2010 | Franko et al. | 345/156 |
| 2003/0107499 | A1 * | 6/2003 | Lepere et al. | 340/945 |
| 2003/0192052 | A1 * | 10/2003 | Frisco et al. | 725/76 |

(Continued)

FOREIGN PATENT DOCUMENTS

DE 199 18 798 11/2000

(Continued)

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

The invention relates to an image viewing system for aircraft passengers, characterized in that it is embodied in the form of a module (10) which comprises a unit (20) for displaying images originating from at least one image source (12, 14, 16), the display unit being tied to an internal wall of the aircraft, in a position parallel to a floor of the aircraft.

22 Claims, 5 Drawing Sheets

U.S. PATENT DOCUMENTS

| | | | | |
|---|---|---|---|---|
| 2003/0194967 | A1* | 10/2003 | Sanford et al. | 455/3.06 |
| 2005/0121978 | A1* | 6/2005 | McAvoy | 307/43 |
| 2005/0268319 | A1* | 12/2005 | Brady | 725/76 |
| 2006/0212909 | A1* | 9/2006 | Girard et al. | 725/73 |
| 2009/0243895 | A1* | 10/2009 | Mitchell et al. | 340/971 |

FOREIGN PATENT DOCUMENTS

| | | |
|---|---|---|
| DE | 103 16 227 | 7/2004 |
| JP | 2000 350195 | 12/2000 |

* cited by examiner

IMAGE VIEWING SYSTEM FOR PASSENGERS OF AN AIRCRAFT AND AIRCRAFT COMPRISING SUCH A SYSTEM

The invention relates to an image viewing system intended for passengers of an aircraft.

It is known that viewing screens mounted vertically and fixed to the back of passenger seats, to the ceiling of aisles situated between the banks of seats and to the panels facing the central bank of seats can be used on board airplanes.

It would nevertheless be useful to have a new viewing system that can be used by several passengers and that is installed in clear spaces of aircraft, for example in the relaxation area of an aircraft of A380 type.

The object of the present invention is an image viewing system for passengers of an aircraft, characterized in that it is constructed in the form of a module provided with a unit for displaying images originating from at least one image source, the display unit being fastened to an internal partition of the aircraft, in a position parallel to a floor of the aircraft.

By mounting the display unit of the module horizontally in this way, or in other words parallel to a cabin floor of the aircraft, it is possible to fix this unit on the floor in a clear space, free of any passenger seat. This space forms a zone accessible to the passengers in order that several of them can view the images there simultaneously.

It will be noted that the display unit may be disposed in a manner substantially parallel to the floor, meaning that the display unit may be strictly parallel or be slightly inclined by a few degrees relative to the floor.

The source of the images, such as video images, is not necessarily integrated into the physical unit forming the viewing module, and in this regard it may be located elsewhere.

In this way it is possible to reduce the space requirement of the system.

Furthermore, in this way the source may be easily used by other viewing systems, whether or not they are according to the invention, or even for other purposes.

According to one characteristic, the display unit has a convex general shape that is appropriate for offering simultaneous viewing to several passengers.

When the viewing system is fixed on the floor, this convex shape, hemispherical, for example, makes it possible to recreate the impression that the passenger would feel when looking at the bottom of the ocean in a glass-bottomed boat or when using a bathyscope.

According to one characteristic, the system is provided with:

- a unit for projecting images furnished by the image source,
- an optical system for adapting, to the display unit, the images projected thereon.

These two elements are integrated into the physical unit that forms the viewing system, and the display unit constitutes an image-projection surface.

More particularly, these elements, as well as the display unit, are mounted close to one another and not in separate locations.

It will be noted that the viewing system becomes more compact and the number of "design" possibilities increases as the distance separating the different elements (such as the projection unit and the display unit) becomes shorter.

In this way it is possible, for example, to reduce the dimensions of the viewing system which is fastened to an internal partition of the aircraft.

It will be noted that the optical system is, for example, an optical correction system that may or may not be part of the image-projection unit. If this optical system is independent, it is, for example, a lens.

According to one characteristic, the system is provided with passenger/viewing system interactive elements that are in relationship with the display unit.

In this way, the multi-passenger viewing system is interactive, in contrast to the traditional collective screens, which are disposed vertically, or in other words perpendicular to the floor of the aircraft and at a distance from the passengers.

By using the means for inputting information into the system, the passengers can therefore choose the information that they wish to view and can act on the image reproducing the chosen information (zoom, colors, etc.).

According to one characteristic, the display unit integrates a tactile layer, and the interactive elements form tactile zones of the layer.

The interactive elements may also be arranged in alternating or non-alternating manner around the display unit.

This spatial distribution is particularly adapted to the arrangement of passengers grouped around the display unit.

According to one characteristic, the system is provided with a data-processing unit, which is, for example, integrated into the module forming the viewing system.

Whether or not it is integrated into the system, the data-processing unit is capable of processing the images that appear on the display unit, which is particularly useful when the passengers wish to interact with the images being viewed, for example, by manipulating them (zoom, etc.).

The data-processing unit and the display unit are mounted, for example, close to one another in such a way as to reduce the space requirement of the module.

It will be noted that the viewing system may not be provided with a projection system and an associated optical system and instead may be provided with a data-processing unit of little thickness, thus giving the assembly formed by the display unit and the processing unit a reduced space requirement in the manner of a flat and compact portable computer.

The display unit is, for example, a screen of LCD type.

In order to be adaptable to the height of the passengers, there is provided a mechanism for adjusting the vertical position of the display unit.

More particularly, the display unit is mounted on a support capable of being fixed on an internal partition of the aircraft.

The partition may be the floor, the ceiling or even a vertical partition of the aircraft, in which case the support forms an elbow in order that the display unit remains horizontal.

According to one characteristic, the support is vertically adjustable by means of a vertical adjusting mechanism and, for example, the mechanism is of the rotary type.

According to one characteristic, the support is provided with a fixation foot that permits fixation of the system to an internal partition of the aircraft.

According to one characteristic, the display unit is fixed on the floor.

According to one characteristic, the viewing module has a vertical height or extension that is smaller than the height or size of the passengers.

In general, the height of the module is situated almost at mid-height of an adult passenger, or in other words at a height of approximately one meter.

This height gives adult passengers in standing position the ability to use the viewing module.

Correlatively, the invention also has as an object an aircraft comprising an image viewing system for aircraft passengers such as that briefly described hereinabove.

Other characteristics and advantages will become apparent in the course of the description hereinafter, given only by way of non-limitative example and written with reference to the attached drawings, wherein.

Figure 4A:
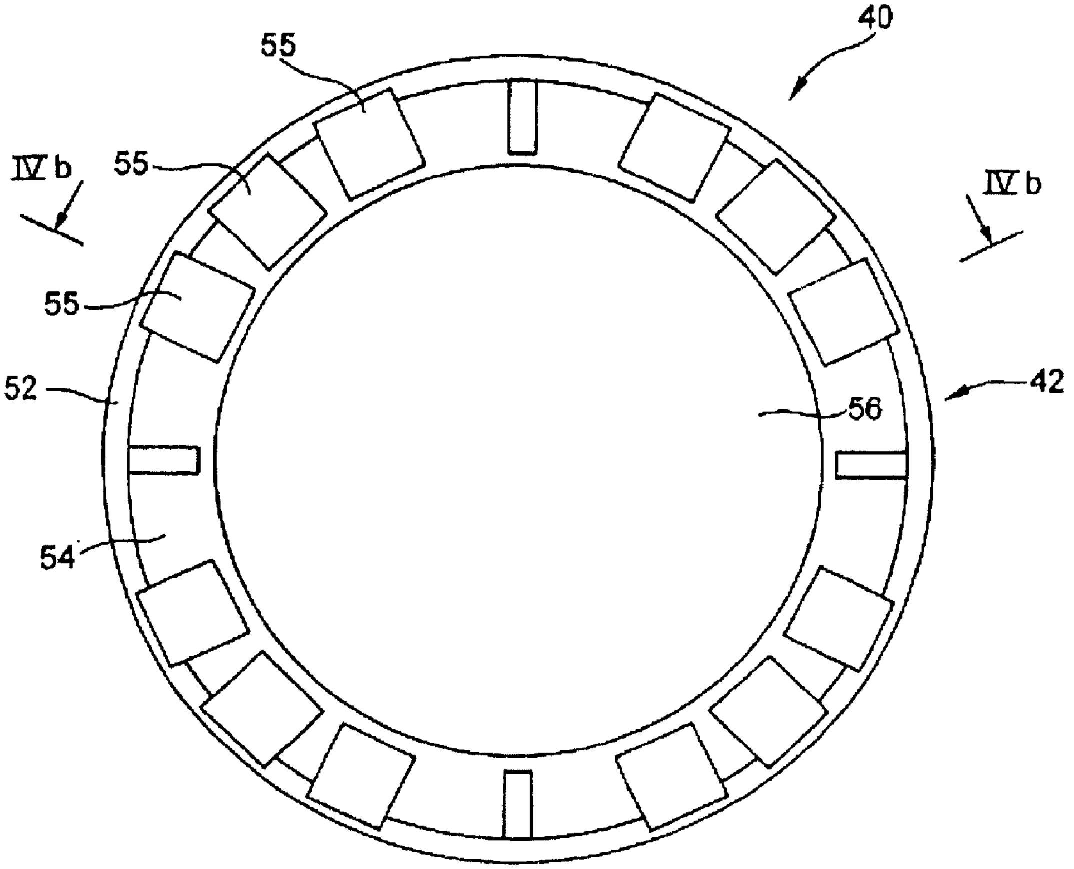
Figure 4B:
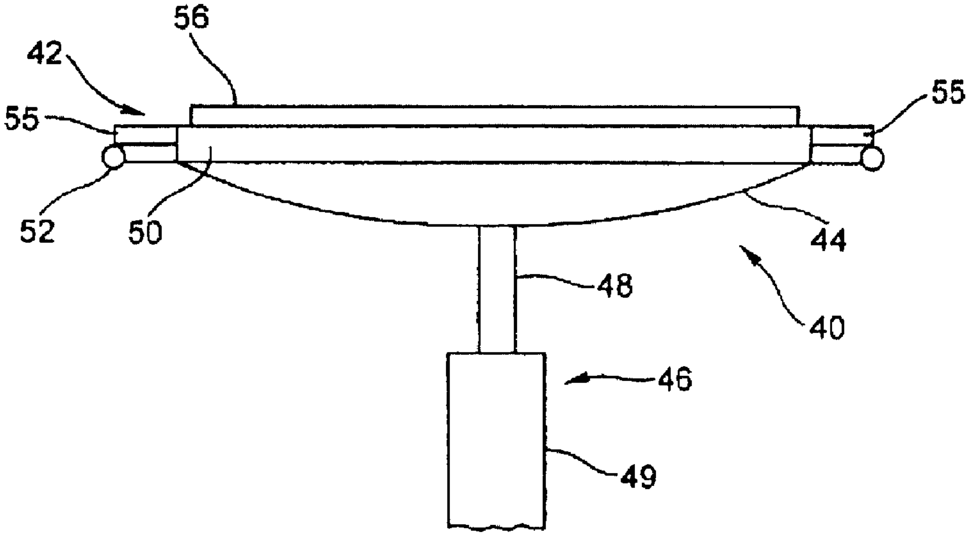

FIGS. 4*a* and 4*b* are schematic views of a second exemplary embodiment of a viewing system according to the invention, FIG. 4*b* being a sectional view according to section plane IVb-IVb of FIG. 4*a;*

Figure 5:
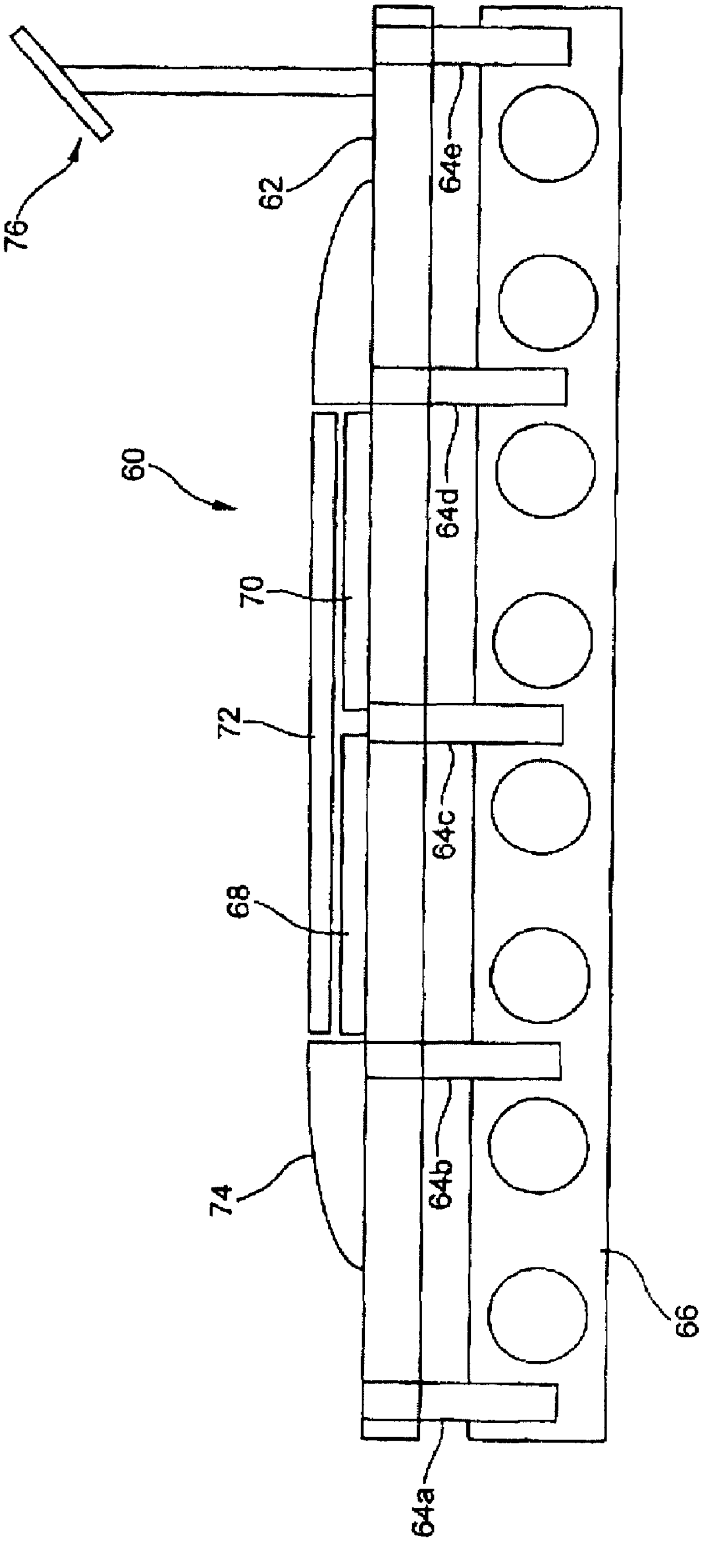
Figure 6:
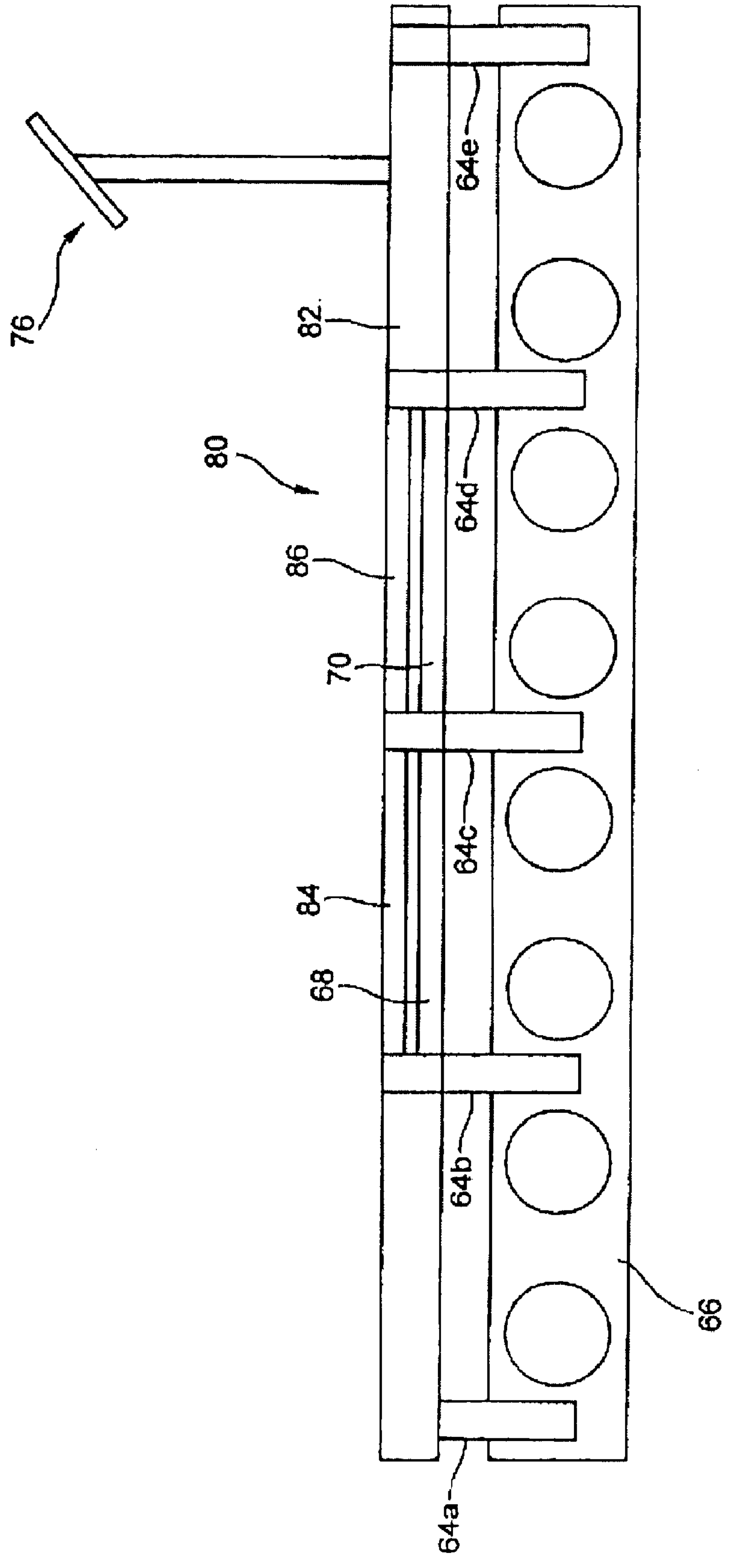

FIG. 5 is a schematic view of a third exemplary embodiment of a viewing system according to the invention;

FIG. 6 is an alternative embodiment of the system of FIG. 5.

Figure 1:
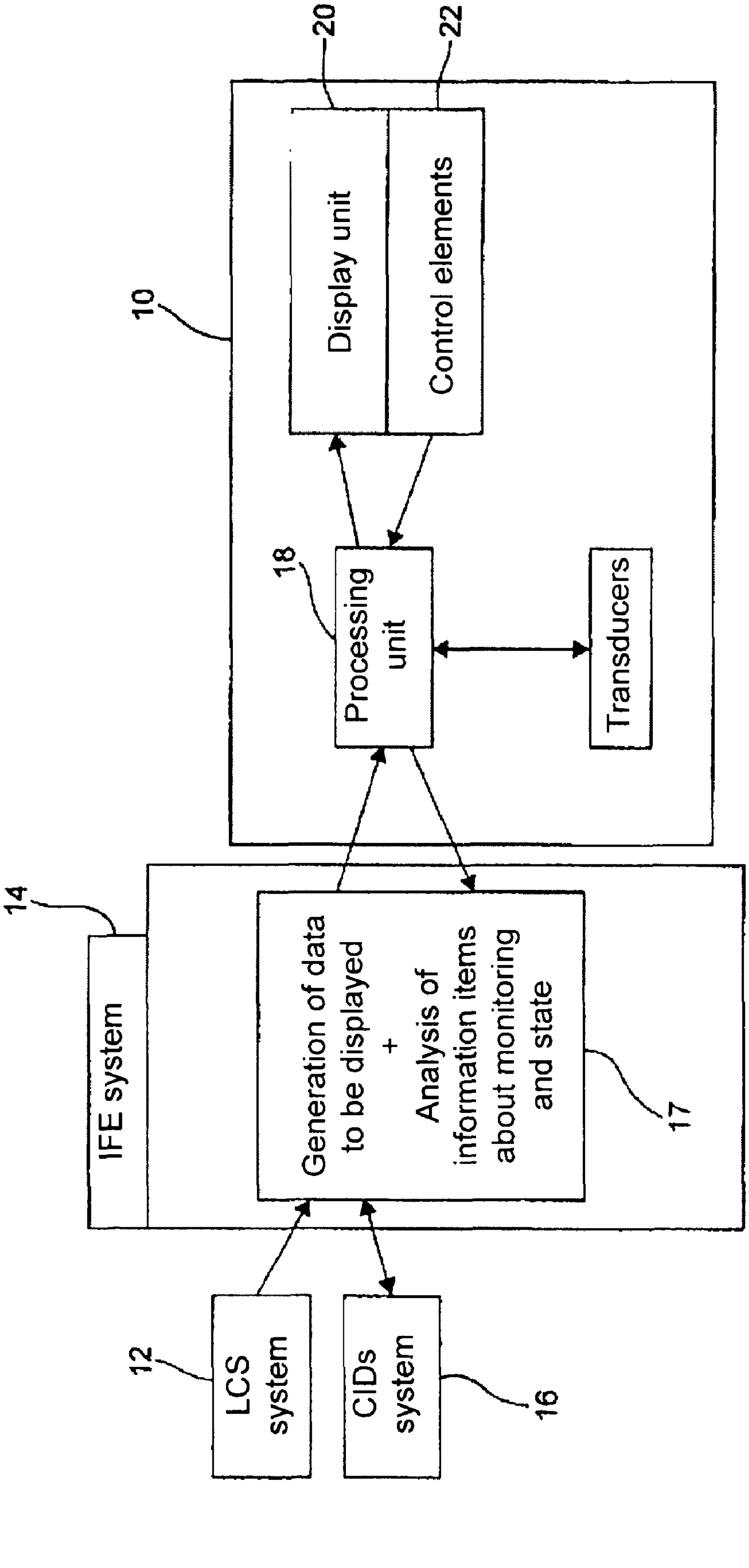
FIG. 1 is a schematic view illustrating the logical architecture of the viewing system according to the invention.

As illustrated in FIG. 1, a logical architecture of an image viewing system according to the invention is provided with the physical unit or module 10 constituting the system proper and a plurality of possible image sources denoted 12, 14 and 16.

According to one variant, the image source or sources may be integrated into system 10.

In the described embodiment, however, the sources are disposed at separate locations.

In this way the space requirement of system 10 can be reduced.

It will be noted that the image data originating from one or more sources are digital, for example, but alternatively they may be in analog form.

Furthermore, the image data are, for example, of video type.

Sources 12, 14, 16 may include video and non-video data and respectively form part of a system denoted LCS (an acronym that in English terminology means "Landscape Control System"), of a system denoted IFE (an acronym that in English terminology means: "In-Flight Entertainment"), and of a system denoted CIDS (an acronym that in English terminology means: "Cabin Intercommunication Data System").

The LCS system furnishes video data originating from cameras placed under the aircraft or at the upper end of the aircraft tail section.

The IFE system furnishes data relating to in-flight entertainment programs (films, commentaries, games, language training methods, etc.).

The CIDS system in turn furnishes data relating to the flight (trajectory of the airplane, speed, altitude and other items of information about the flight).

It will be noted that the transmission between sources 12, 14 and 16 and system 10 may be achieved by means of a cable or wirelessly, such as by a radio link.

As illustrated in FIG. 1, IFE system 14, for example, receives data originating from sources 12 (video images) and 16 (information items to be used for the display, such as information items about the flight), and processes them in a data management module 17.

It will be noted that module 17 also generates data specific to system 14, which itself also is a possible source of data (in-flight entertainment data).

These data are also transmitted to system 10.

Physical module or device 10, which constitutes the viewing system, integrates a data-processing unit 18, which is connected to system 14 and is capable of communicating therewith, in both transmission and reception.

When the data to be displayed have been processed, they are transmitted to system 10.

It will be noted that, under certain circumstances, processing unit 18 may itself generate the data to be displayed from sources 12, 14 and 16 without the intervention of the function of management module 17 for generating data to be displayed.

Furthermore, in other embodiments that are not illustrated, processing unit 18 may be disposed at a separate location and thus may not be part of the physical unit constituting viewing system 10, thus reducing the volume and weight thereof.

System 10 also integrates a display unit 20, which makes it possible to display video or non-video images that have passed through processing unit 18 or have been generated in their entirety thereby.

It will be noted that the images transmitted by the source or sources may nevertheless be subjected to several transformations (post-processing of the shaping type, adaptation to system 10, etc.) by unit 18 before they are displayed. In this way, possible optical and chromatic defects can be corrected before the images are displayed.

This display unit, which is constructed, for example, in the form of a screen, is a display unit accessible simultaneously by several passengers.

System 10 is also provided with a subsystem 22 for interaction between the passengers and the viewing system and that is in relationship with display unit 20.

This multi-passenger interactive subsystem is provided with interactive elements (control elements) that permit several passengers to exert control over the system via means for inputting into the system.

These input means are, for example, passenger/viewing system interactive elements that will be described later in relation with FIGS. 3 and 4*a*, 4*b*.

These control elements are in relationship with processing unit 18, in order to intervene in the display of data by transmitting commands. Other control elements are, for example, remotely accessible by the on-board personnel, who may transmit commands to unit 18 to control the display of data.

Interactive subsystem 22 permits the passengers and the on-board personnel to exercise a plurality of functions over the viewing system according to the invention, such as:

- image manipulation: zoom, rotation, translation, default preset mode (a set of initial settings such as zoom level, image orientation, namely, the height of the image can be directed toward the nose section of the airplane or toward the north or else parameterized between 0° and 360° by the user, etc.);
- image adjustment: artificial colors, real colors, contrast, luminosity, default preset mode (infrared or digitally processed images to highlight political frontiers, land/sea boundaries, mountain zones, etc.);
- image information items obtained by computerized processing of images to emphasize information items comprehensible to a user (geographic, physical, political, etc.): location of the territory or cities over which the airplane is flying at a given moment, wind, altitude, default preset mode;
- types of data to be displayed: data originating from the LCS system, data originating from the cockpit (such as information items originating from the cockpit via the CIDS system and asking the passengers to return to their seats), data concerning the flight, entertainment programs.

Transducers C may also be part of viewing system 10 according to the invention and retrieve information from the system itself or from its environment.

For example, they may be luminosity transducers associated with the display unit, temperature transducers, hygrometry transducers, etc.

Processing unit 18 communicates with these transducers if they are "intelligent" transducers (equipped with a calculation unit), or otherwise it merely obtains the information items that they have collected.

From the information items retrieved by the transducers, processing unit 18 prepares information items about maintenance of the constituent elements of system 10 as well as information items about the state of this system, and transmits them to management module 17 of IFE system 14.

The latter analyzes the information items received then transmits these information items to the CIDS system, which thus may utilize them.

In this way it is possible to provide for replacement of a constituent element of system 10 if the maintenance information items indicates that it is at the end of its life (example: light bulb).

Figure 2:
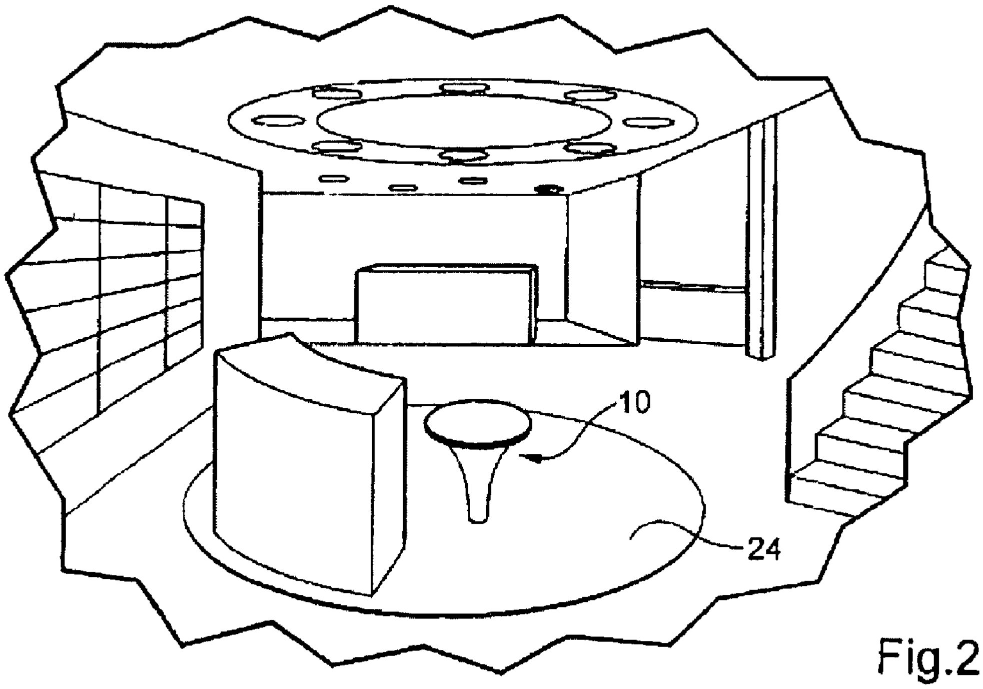
FIG. 2 is a schematic view of the layout of the viewing system according to the invention.

As illustrated in FIG. 2, a zone of an aircraft such as a commercial airplane of A380 type or of a private airplane (which is the property of companies, governments or physical persons) constitutes a common relaxation area for the passengers of the airplane and permits installation of a viewing system according to the invention.

The viewing system according to the invention is fixed by bolting, welding or any other appropriate means to an internal partition of the aircraft, which is, for example in FIG. 2, floor 24 of this common zone.

The open space is free of any passenger seat and is large enough that several passengers can assemble around viewing system 10, which, for example, is installed more or less at the center of this space.

Thus, as illustrated in FIG. 2, the display unit of the viewing system according to the invention is mounted in more or less horizontal position, which in the present case is parallel with the floor of the aircraft.

If the display unit was too greatly inclined relative to the horizontal, it would make it difficult for passengers standing up and looking downward to view images on the display unit.

The passengers grouped around the display unit are able to view thereon displayed information items relating to an exterior view of the airplane, such as a view of the ground over which this airplane is flying (obtained by cameras mounted on the airplane or by satellite), or geographic information items based on a real view and analyzed by processing unit 18 of FIG. 1, accompanied on the display by real-time comments from a database of different geographic maps.

Viewing system 10 of FIG. 2 is illustrated in more detailed manner in longitudinal section in FIG. 3, which will now be described.

In schematic terms, viewing system 10 comprises display unit 20 mounted on a support 30 and forming therewith the external physical envelope of the viewing system.

As indicated above, display unit 20 is more or less parallel to the floor of the aircraft, and in this exemplary embodiment is constructed in the form of a semi-transparent screen 25 of general convex shape, which in the present case is hemispherical, in this way projecting images upward.

The screen, for example, has a diameter of 800 mm.

It may be made of tempered glass or laminated glass or plexiglass, which constitutes the frosted curved surface for projection of images.

It will be noted that the curvature imparted to the screen gives the passengers the impression of looking through the glass bottom of certain boats used for observation of underwater scenes.

Figure 3:
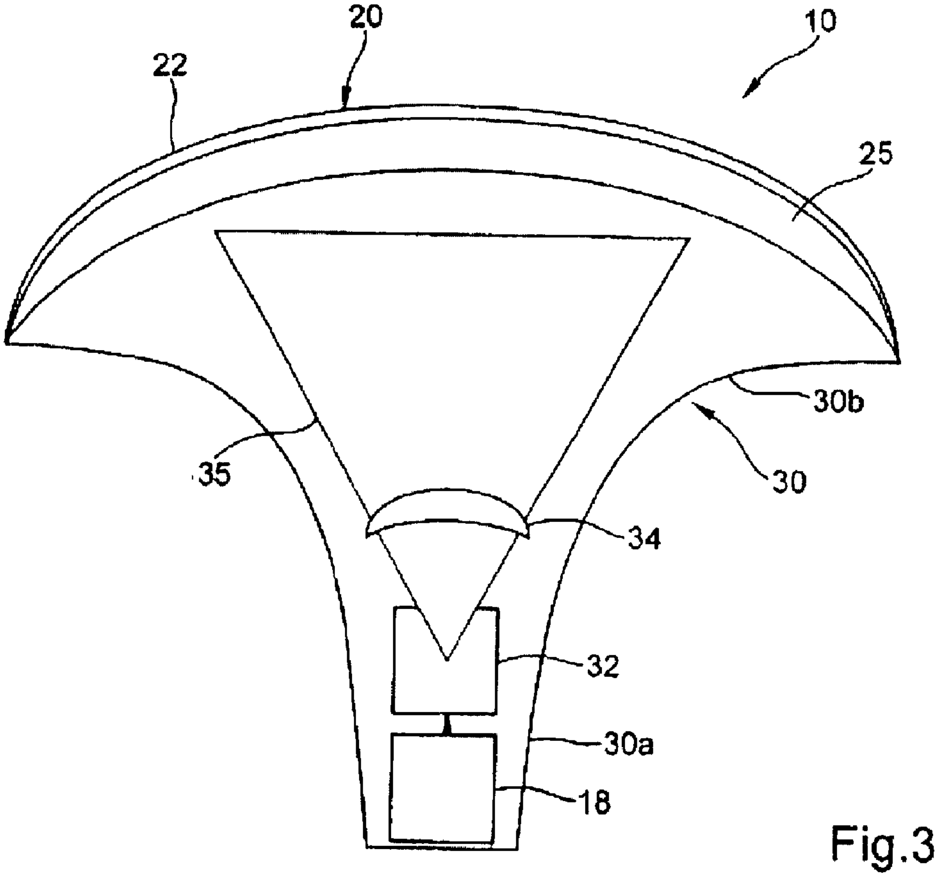
FIG. 3 is a schematic view of a first exemplary embodiment of a viewing system according to the invention.

Furthermore, the more or less horizontal arrangement of the screen of FIG. 3 reproduces the natural sense of vision downward.

The spatial arrangement of the screen is defined relative to the spatial orientation of the axis of rotation or of symmetry of the screen surface in the case of a hemispherical or circular surface, or of the normal to the screen surface in the case of a plane surface.

Thus a horizontal arrangement of the screen means that the axis of rotation or symmetry or the normal to the surface of the screen is vertical.

In this exemplary embodiment, viewing system 10 is not vertically adjustable, and support 30 appears in the form of a fixation foot 30*a*, which is intended for fixation of the support, for example to the floor, and which extends upward in a flared shape 30*b*, becoming horizontal, and on which display unit 20 is braced.

Foot 30*a* is, for example, fixed to the longitudinal and/or transverse beams constituting the framework of the floor.

The shape imparted to the viewing system resembles that of a mushroom.

In the interior of the block or module constituting system 10, there is disposed, in the interior part of the foot, data-processing unit 18 and thereabove a unit 32 for projecting images that either are furnished by one of the data sources of FIG. 1 or are generated by processing unit 18.

This video projection unit may be, for example, an LCD projector.

It may also be a video projection unit of DLP type (an acronym that in English terminology means "Digital Light Processing™"), marketed by the MITSUBISHI Co., for example, which is provided with three diodes of LED type as light source, weighs 500 g and has the following dimensions: 150×100×50 mm.

Alternatively, the video projection unit may be composed of an LCD matrix, of a light bulb or of a diode matrix.

System 10 is also provided with an optical system 34 for adapting, to display unit 20 (screen 25), images that are projected thereon.

The optical system makes it possible to achieve optical diffusion of these images, thus geometrically adapting the images to the curvature of the display unit.

Such an optical diffusion system is composed, for example, of Fresnel lenses or of optical lenses of glass or appropriate plastics.

The optical beam obtained in this way is illustrated very schematically by reference 35 in FIG. 3.

It will be noted that other geometric corrections for improving the quality of the image on the display (for example, correction of optical aberrations) are imposed, for example, by mathematical algorithms used by processing unit 18.

In addition, display unit 20 integrates a tactile layer 22, flexible, for example, which is provided with passenger/system interactive elements constituting tactile zones of the screen (interactive subsystem 22 of FIG. 1).

The tactile layer (resistive, capacitive or from another technology) transmits the information items received to processing unit 18 via a physical link not illustrated.

It will be noted that screen 25 may alternatively be a screen of holographic type.

This latter type of screen is composed of a hologram of the screen surface and not a hologram of the formed image, thus making it possible to avoid stray light while offering a broadened range of colors.

Such a screen is described, for example, in the document WO 03012495. The different interactive elements are, for example, distributed over the periphery of the screen to facilitate access thereto by the passengers grouped around the system.

The height over which module 10 extends is smaller than that of an adult passenger and, for example, is situated at human mid-height (for example, between 90 cm and 1 m, or even 1.20 m). Thus the passengers merely have to lower their eyes to view images.

It will be noted in this exemplary embodiment that data-processing unit 18 and display unit 20 as well as projection unit 32 and optical system 34 are mounted close to one another, in order to reduce the overall volume of viewing system 10.

Referring now to FIGS. 4*a* and 4*b*, there will be described a second exemplary embodiment of a viewing system according to the invention.

Viewing system 40 according to the invention conforms with the description pertaining to system 10 of FIG. 1, but has a configuration different from that illustrated in FIG. 3.

Nevertheless, just as for system 10, viewing system 40 may also be installed in a clear zone of an aircraft, such as that illustrated in FIG. 2.

Module 40 of FIGS. 4*a* and 4*b* is provided with a display unit 42 mounted against a data-processing unit 44 of small thickness or in proximity thereto, in such a way as to give the assembly composed of the two units 42 and 44 a reduced space requirement.

This assembly is mounted on a support 46 (FIG. 4*b*) fixed on an internal partition of the aircraft which is, for example, a cabin floor thereof, such as floor 24 of FIG. 2.

As illustrated in FIG. 4*b*, display unit 42 is mounted horizontally, or in other words in a position parallel to the floor of the aircraft, and the vertical position or height of this display unit can be adjusted vertically.

This adjustment is made possible by virtue of the low weight of the viewing system. In this embodiment, the system effectively does not comprise frosted glass, optical adaptation system and projection unit.

More particularly, support 46 is provided with a fixation foot 48 of rotary type which makes it possible to ensure adjustment of the vertical position of display unit 42 and therefore of viewing system 40.

Foot 48 is mounted in rotary manner in a cylindrical base 49 of the support, which is fixed to the floor, and it cooperates with the internal surface of the latter by way of complementary threads in the manner of an assembly of nut-and-screw type.

In this way, by simple rotation of the assembly composed of the display unit and the data-processing unit, viewing system 40 can be raised or lowered in order to adjust it to the desired height for the passengers who wish to use it.

However, it is important to emphasize that, in its maximally extended position, the vertical dimension of the module is always much smaller than that of an adult passenger (example: 1.75 m), because, beyond a certain height, the passengers standing up do not have sufficient vertical room to view images.

It will be noted that foot 48, in addition to its mechanical function, also ensures transmission of electric signals to data-processing unit 44 and to display unit 42, and likewise from unit 44 to points outside the system.

It is possible, for example, to transmit the necessary electric energy to the system exclusively via the foot and to transmit the data between the system and the external sources of FIG. 1 wirelessly.

In this regard, the electric connector used for electric transmission between two mounted parts that can rotate relative to one another, and which is described, for example, in the document FR 2690285, can be used in support 46 of FIG. 4*b*.

It is important to note that the viewing system according to the invention can be adjusted in its vertical position by mechanisms other than the rotary system illustrated in FIG. 4*b* and, for example, by a hydraulic system using a jack.

As illustrated in FIG. 4*b*, display unit 42 is provided with a circular screen 50, for example of LCD or OLED type (an acronym that in English terminology means "Organic Light Emitting Diode"), which is mounted on a circular frame 52 having greater diameter than that of screen 50.

An annular space 54 is made between the external peripheral rim of frame 52 and the external peripheral rim of screen 50, and a plurality of passenger/viewing system interactive elements 55 is arranged in this space (FIG. 4*a*).

These interactive elements arranged around screen 50 are directly accessible to the passengers disposed around viewing system 40, and, for example, are distributed regularly over four angular sectors of the frame.

It will be noted that these interactive elements are, for example, buttons constituting part of input means 22 of the interactive subsystem of FIG. 1.

Each of these buttons is, for example, dedicated to a single function, in order to facilitate comprehension and use of the system by the passengers.

For example, one button is provided for activating the "zoom+" function and another button is provided for activating the "zoom−" function.

Thus the buttons have two positions: one for activating the function and the other for deactivating it.

Furthermore, display unit 42 is also provided with a tactile layer 56 provided with tactile zones, which in themselves constitute another part of input means 22.

This layer 56 (capacitive, resistive or from another technology) is connected, in a manner not illustrated, to processing unit 44 by physical connections.

It will be noted that the multi-passenger viewing systems of FIGS. 3, 4*a* and 4*b*, by permitting access to several passengers simultaneously and by offering them possibilities of interaction with the system, are particularly user-friendly.

In addition, the fact that these viewing systems are mounted on one of the cabin floors of the airplane permits the passengers to view images while in standing position, which is particularly useful on long-distance flights in which, for physiological reasons, the passengers are advised not to remain seated throughout the duration of the flight.

In this way, while standing up, they can also benefit from viewing systems that are nevertheless different from those normally reserved for seated passengers.

In a variant not illustrated in the figures, the viewing system according to the invention can also be provided with a display unit mounted more or less horizontally and fixed to the ceiling, so as to permit a passenger settled in his reclinable armchair to view video images (entertainment programs, etc.) in almost recumbent position.

Furthermore, the viewing system according to the invention can also be fixed to a vertical internal partition of the aircraft (not illustrated) and, in this case, the display unit is fixed to this partition by way of a lateral elbowed support, which assures transmission of electric energy and data.

Furthermore, the viewing system illustrated in the different figures has limited weight, which makes it particularly usable in aircraft.

It will be noted that it is possible to increase the resolution of a viewing system according to the invention by including a greater number of projection units or screens.

Thus, on the basis of four projection units with individual resolutions of 800×600, it is conceivable that a final resolution of 1600×1200 can be achieved for the system.

Such a technology already exists for achieving enhanced resolution on the walls of screens used as equipment in control rooms.

In addition, the viewing system according to the invention can also be provided with a display unit fastened to the floor of the aircraft, and FIGS. 5 and 6 illustrate two possible variants of such an embodiment.

Everything explained in the foregoing for the system of FIGS. 3, 4*a* and 4*b* remains valid here, with the exception, however, that the system is fixed to the partition.

In FIG. 5, a viewing system 60 according to the invention is fixed to floor 62, which is supported by interlocked longitudinal—64*a* to *e*—and transverse rails or beams, a single transverse beam 66 being illustrated in this figure.

System 60 is provided with a plurality of display units, for example four (only two display units 68 and 70 are illustrated), each mounted between two longitudinal beams and between two transverse beams.

A translucent protective panel 72 covers the display units.

Furthermore, a peripheral molding or frame 74 having a convex exterior surface is fixed to floor 62 and surrounds the display units and protective panel 72, in order to ensure a smooth transition between the level of the floor and that of the panel.

As illustrated, this molding forms an inclined slope making it possible to connect the two surfaces in non-abrupt manner.

It will be noted that the different elements 68, 70, 72 and 74 were intentionally illustrated in a manner in which they are not joined to one another, so as to facilitate their identification.

Furthermore, the assembly composed of display units, panel and molding constitutes, for example, a single block, which is fixed to the floor or to the beams supporting it by conventional means commonly used in aeronautics.

It is important to note that the display units are in communication (via a VGA ribbon or cable) with a data-processing unit, not illustrated, which may be placed underneath the floor in proximity to the display units or may be at a separate location.

A control bracket 76, also fixed to the floor and connected to the data-processing unit, supports the passenger/viewing system interactive elements and places them at a height accessible to the passengers (interactive terminal).

According to one variant, not illustrated, a tactile panel is mounted on protective panel 72 and is provided with tactile zones accessible to the feet of the passengers.

Viewing system 80 of FIG. 6 is provided with the same elements as system 60 of FIG. 5, or in other words four display units and one translucent protective panel.

In contrast to system 60, however, display units 68 and 70 are each integrated into a recess of floor 82 between two longitudinal beams. The protective panel in turn is subdivided into four panels (only two panels 84 and 86 are illustrated), each covering one display unit and each integrated into the same recess as the latter.

In this way the assembly composed of display units and protective panels no longer projects relative to floor 82 and is directly integrated into it.

The invention claimed is:

1. An image viewing system for passengers of an aircraft, comprising:

a module provided with a display unit configured to display images originating from at least one image source, wherein the display unit is disposed in a position parallel to a floor of the aircraft when the module is fastened to an internal partition of the aircraft, and the display unit is configured to be accessible to the passengers simultaneously.

2. A system according to claim 1, wherein the display unit has a convex general shape.

3. A system according to claim 2, wherein the display unit has a hemispherical general shape.

4. A system according to one of claims 1 to 3, further comprising:

a projection unit configured to project images furnished by the at least one image source; and an optical system configured to adapt, to the display unit, the images projected thereon.

5. A system according to claim 1, further comprising:

passenger/viewing system interactive elements that are associated with the display unit.

6. A system according to claim 5, wherein the display unit integrates a tactile layer, and the interactive elements form tactile zones of the layer.

7. A system according to claim 5 or 6, further comprising:

a plurality of interactive elements arranged around the display unit.

8. A system according to claim 1, further comprising:

a data-processing unit.

9. A system according to claim 1, further comprising:

a mechanism configured to adjust the vertical position of the display unit.

10. A system according to claim 1, wherein the display unit is mounted on a support capable of being fixed on an internal partition of the aircraft.

11. A system according to claim 10, wherein the support is provided with a fixation foot.

12. A system according to claim 10 or 11, further comprising:

an adjustment mechanism configured to vertically adjust the support.

13. A system according to claim 12, wherein the adjustment mechanism is of the rotary type.

14. A system according to claim 1, wherein the module has a height that is smaller than the height of the passengers.

15. An aircraft comprising the image viewing system for passengers of an aircraft according to claim 1.

16. An aircraft according to claim 15, wherein the module is installed in a clear zone of the aircraft accessible to several passengers.

17. An aircraft according to claim 15 or 16, wherein the internal partition is the floor.

18. An aircraft according to claim 17, wherein the display unit is fixed to the floor.

19. An aircraft according to claim 15 or 16, wherein the internal partition is a ceiling of the aircraft.

20. A system according to claim 1, wherein the display unit has a circular shape.

21. A system according to claim 20, wherein the display unit is configured to be viewed from a plurality of positions around the periphery of the display unit.

22. A system according to claim 1, wherein the display unit is mounted on a support and forms therewith an external physical envelope of the image viewing system.

* * * * *